(12) United States Patent
Tavor (10) Patent No.: US 7,194,405 B2
(45) Date of Patent: Mar. 20, 2007

(54) METHOD FOR PRESENTING A NATURAL LANGUAGE COMPARISON OF ITEMS

(75) Inventor: Onn Tavor, Ramat Hasharon (IL)

(73) Assignee: Activepoint Ltd., Natanya (IL)

( * ) Notice: Subject to any disclaimer, the term of this patent is extended or adjusted under 35 U.S.C. 154(b) by 936 days.

(21) Appl. No.: 09/829,961

(22) Filed: Apr. 11, 2001

(65) Prior Publication Data

US 2001/0032077 A1 Oct. 18, 2001

Related U.S. Application Data

(60) Provisional application No. 60/196,303, filed on Apr. 12, 2000.

(51) Int. Cl.
G06F 17/27 (2006.01)
G06F 17/28 (2006.01)

(52) U.S. Cl. .................. 704/9; 704/7; 705/26; 705/27; 705/28

(58) Field of Classification Search .................. 704/9, 704/7; 705/7, 9, 8, 27, 28, 26, 14, 10, 6; 707/3
See application file for complete search history.

(56) References Cited

U.S. PATENT DOCUMENTS

| 5,515,268 A | * | 5/1996 | Yoda ........................... 705/26 |
| 5,799,268 A | * | 8/1998 | Boguraev ....................... 704/9 |
| 5,870,716 A | * | 2/1999 | Sugiyama et al. ............ 705/26 |
| 6,304,854 B1 | * | 10/2001 | Harris ........................... 705/27 |
| 6,374,270 B1 | * | 4/2002 | Maimon et al. ............... 704/9 |
| 6,385,610 B1 | * | 5/2002 | Deffler et al. .................. 707/6 |
| 6,405,175 B1 | * | 6/2002 | Ng ............................... 705/14 |
| 6,460,020 B1 | * | 10/2002 | Pool et al. .................... 705/26 |
| 6,606,607 B1 | * | 8/2003 | Martin et al. ................ 705/37 |
| 6,829,603 B1 | * | 12/2004 | Chai et al. .................... 704/9 |
| 2002/0004753 A1 | * | 1/2002 | Perkowski .................... 705/26 |
| 2002/0099622 A1 | * | 7/2002 | Langhammer ............... 705/26 |
| 2002/0194058 A1 | * | 12/2002 | Eldering ....................... 705/10 |
| 2004/0093255 A1 | * | 5/2004 | Kelman et al. ................ 705/8 |

OTHER PUBLICATIONS

Pieraccini et al. Factorization of Language Constraints in Speech Recognition, Jun. 1991, 29th Annual Meeting of the Association for ational Linguistics, pp. 299-306.*

* cited by examiner

Primary Examiner—Richemond Dorvil
Assistant Examiner—Thomas E. Shortledge
(74) Attorney, Agent, or Firm—Mark M. Friedman (57) ABSTRACT

The following application is to describe a method and apparatus for performing a concise and meaningful comparison between an unlimited amount of products, presenting the user with a natural language output. The apparatus is encapsulated as a stand alone web server application and does not require the use of an external third party tools and can be use by any Web Site with no need for a significant change in the structure or the back bone technology deployed by said web site.

17 Claims, 2 Drawing Sheets

FIG. 1 – "Standard" Compare

FIG. 2 – "Relational" Compare

METHOD FOR PRESENTING A NATURAL LANGUAGE COMPARISON OF ITEMS

This is a continuation-in-part of U.S. Provisional Patent Application No. 60/196,303, filed Apr. 12, 2000.

The present apparatus includes two techniques of comparison, which when desired, may be combined to provide the full solution described above.

STANDARD COMPARE

Figure 1:
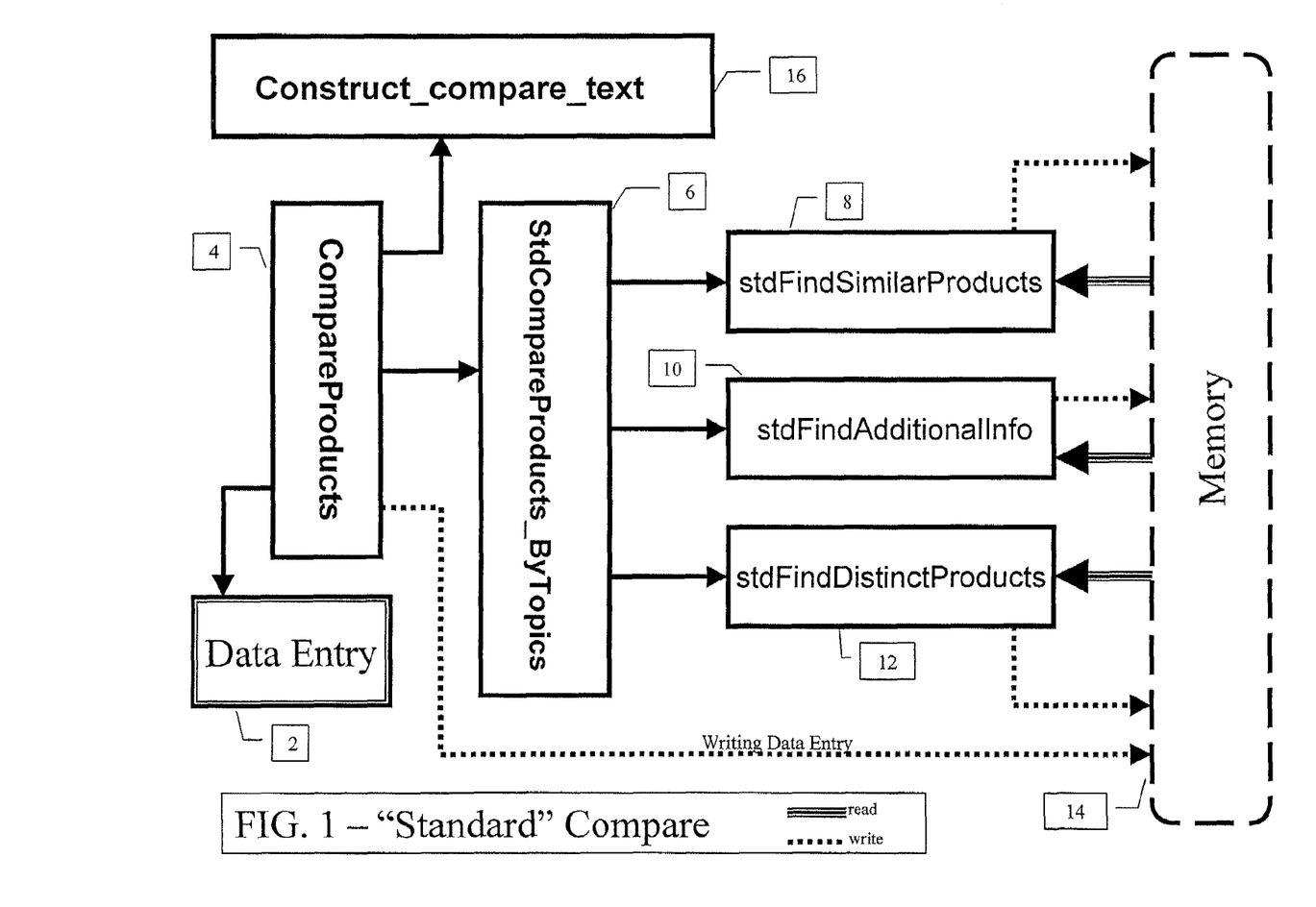
FIG. 1 depicts a block diagram of the "Standard" compare routine.
Figure 2:
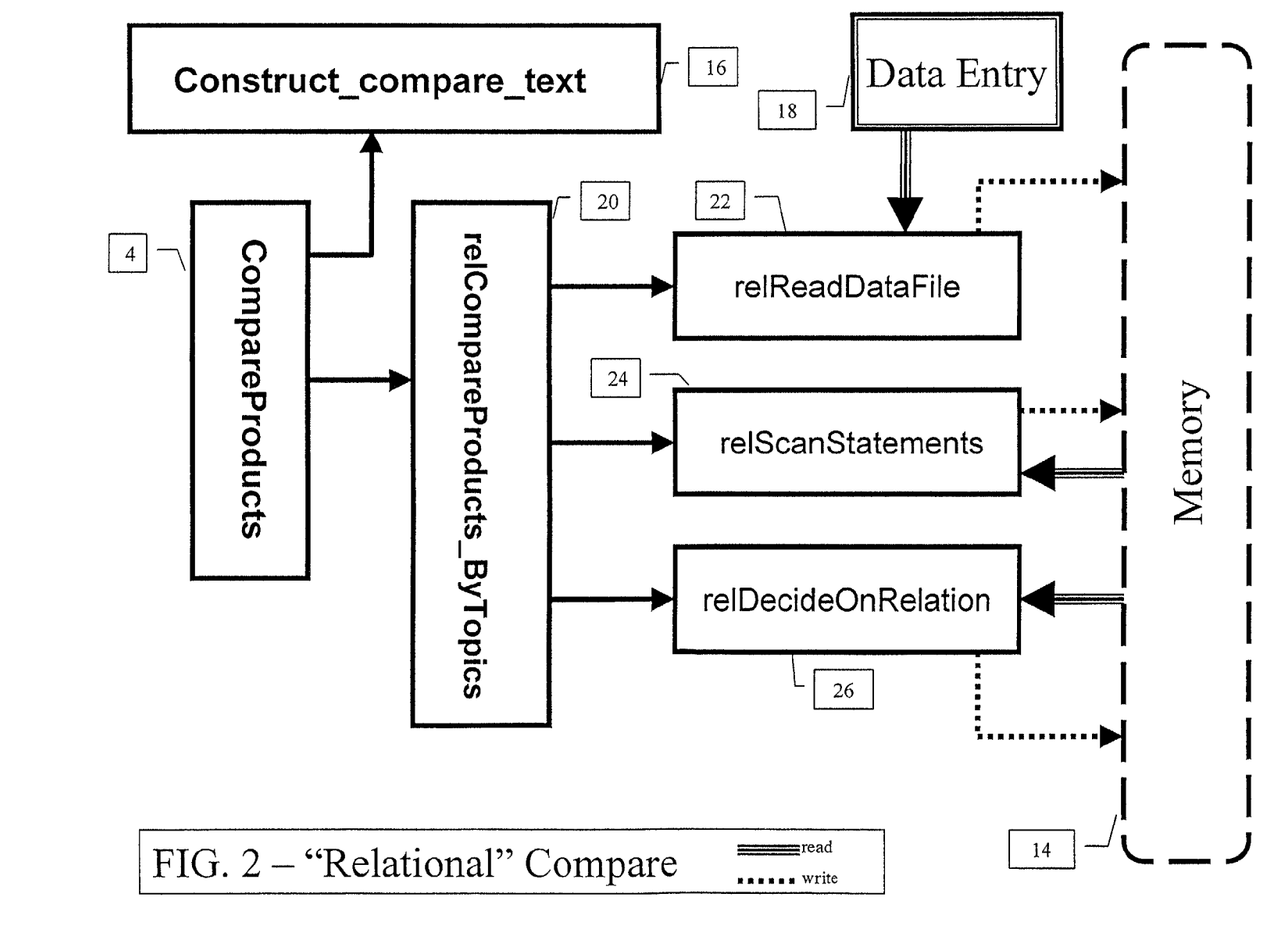
FIG. 2 depicts a block diagram of the "Relational" compare routine.

Data Entry the data needed for performing said compare operation shall include: a) product names, b) topics the merchant wishes to mention to a site visitor. These topics are defined per each product separately. C) Values of said topics for said each product.

This data is to reside in an ASCII file that will be read by the application and structured as "cmp_data(Topic, Value, ProductName)" entries.

Describe Structure
  Algorithms
  General
  The algorithm works as follows:

The application is launched by a request made either by another application (via pipe, for example) or by HTTP request from a web page. Provided the request will contain the names of the products needed to be compared by the application, and the topics by which the comparison is to be made, the application shall perform the following steps: 1) Retrieve the information relevant to said products. 2) Harvest the values of said topics (if specified) for said products from the information retrieved in step 1. 3) Perform the comparison of said products with the use of the respective topic-value pairs of each product and 4) construct a natural language output to report the results of the comparison. After sending said output (using a pipe, standard output write functions or the like) the application shall exit.

Detailed Description of the Algorithms
  CompareProducts

This is the main procedure of the comparison module. This routine is to receive the request to compare some given products using one of the three comparison techniques: standard, fuzzy or intermixed. This routine is to read the data entries located in the external files to retrieve the necessary information about said products and store the information in the memory to make it accessible to the following routines. After this task is accomplished, CompareProducts will make a call to "stdCompareProducts_ByTopics" to perform the comparison, followed by "ConstructNLSentence" to perform the construction of the natural language output.

stdCompareProducts_ByTopics

This routine receives the names of the products and the topics by which the comparison of said products should be made as input. If no topics were specified as an input, the products will be compared by all available topics. The routine also has a direct access to the memory where the information about said products' topics and values was previously stored by "CompareProducts".

The first attempt, is to find and group similar products. This is accomplished by a call to a function named "stdFindSimilarProducts". The function searches for identical topic-value pairs in the "cmp_data(Topic, Value, ProductName)" entries and gathers the names of the products that have said identical entries into "similar_prd(Topic, Value, SimilarProducts)" structure. The corresponding "cmp_data" entries are removed from the memory since they are no longer needed. When there are no more "cmp_data" entries to scan, this routine will start scanning the "similar_prd" entries, in order to group all the topic-value pairs by which a given list of products is identical. The result is stored in memory entries of a form "prd_similar_by(TopicValuePairs, ListOfProducts)".

Since products may be similar by few topics but different by others and also due to the reason that products may have more than one value associated with a certain topic, there's a need for an additional analysis in order to find these additional topics that differentiate said partially similar products. To perform this task, a procedure named "stdFindAdditionalInfo" is called. This routine reads the memory entries "prd_similar_by(TopicValuePairs, ListOfProducts)" and attempts to find additional "cmp_data(Topic, Value, ProductName)" entries for each product in ListOfProducts. These additional entries, if present, are removed and the information is stored in "additional_info(Topic, Value, Product, ListOfProducts)" where ListOfProducts is the original products list associated with Product in "prd_similar_by (TopicValuePairs, ListOfProducts)" entry. When there are no more "prd_similar_by" entries to scan, "stdFindAdditionalInfo" exits.

The last step in performing the comparison between products is to find the distinct products, i.e—products that can not be grouped under any topic. A good example for this is trying to compare a blue, large and square item with a red, small and round item (these items are not identical by any topic). For this purpose, "stdCompareProducts_ByTopics" will call the routine "stdFindDistinctProducts". The task to be performed by this routine is rather simple—all the information still present in "cmp_data" entries is to be copied to "prd_distinct_by(TopicValuePairs, NameOfProduct)" entries in the memory while removing the respective "cmp_data" entries.

At this point everything is ready for the construction of the natural language output and "stdCompareProducts_ByTopics" exits. It is now up to "CompareProducts" to decide which routine is to be executed to perform said output, based on the comparison type.

Relational Compare

Data Entry

Hence is described a module to perform a product comparison with a so called "relational" technique, i.e operate with statements of the form "bigger than . . . ", "rather sweet", "a bit smaller than . . . " when comparing products.

Since the above statements are known in the art as "fuzzy statements", a fuzzy-logic based implementation of said comparison would be appropriate.

Several types of data need to be defined. The first data entries are the topics by which the comparison is to be made. The definitions of the topics should include the range of values that can be associated with the topic (range(MinimumValue, MaximumValue)), a word to designate the maximal value that can be associated with a product (max_word (MaximalValuePossible)), a word to designate the minimal value that can be associated with a product (min_word (MinimalValuePossible)), a word to state a relation of being close to the maximal value (grt_word(GrtWord)) and a word to state a relation of being close to the minimal value (sml_word(GrtWord)).

Several words to designate values somewhere inside the range are also allowed. These are done through "mid_word (Index, MidWord)", Index being used for logical positioning the MidWord inside the range—1 is the closest to the minimal value, 2—is a bit farther than the previous and so on.

The following example sheds more light on this issue. Let's examine the topic "taste" assuming the range is "sweet" to "dry" (very reasonable values when discussing wines, for example). When comparing two products we may say "this wine is sweeter than the other wine" or "this wine is drier than the other wine". In a similar form, a given sort of wine can be "the sweetest" or "the driest" we have. Another type of wine can also be "semi-dry". Hence, the words "sweeter" and "drier" serve as "sml_word" and "grt_word", "semi-dry" is our "mid_word", and "sweetest" and "driest" are taken as "min_word" and "max_word"

However, this is not quite enough to make the comparison sales-oriented. If we want to compare two pairs of speakers, for instance, and use the topic "sound distortions" than: 1) the range is "very low" to "very high" 2) "max_word" would be "highest" and "min_word" would be "lowest" and 3) "sml_word" would be "lower" and "grt_word" would be "higher". But how can we represent the fact that the lower the sound distortions are the better the speaker is? For this purpose, the "better edge" of the range needs to be defined. The representation would be "better_edge(CharacterThatRepresentsTheBetterEdge) when '+' is the right part of the edge, '−' is the left part of the edge and 'n' symbolizes that there is no "better edge", i.e. any value is neutral.

The second data type represents the connection between said topics and the products. This connection is represented by "fuzzy_statement(TopicName,Grade,ProductName)". That means, that each product is assigned a numeric value of the topic, said value being an integral number between 1 and 100. This value positions the product in the range of the topic, so that if we are discussing a certain type of wine, that has the value 20 for the topic "taste" as described above, we will be able to say that the wine is rather sweet.

The third data entry describes a prepared stack of words to show amount of difference between products. The representation of this data reads as diff_scale(MinimalNumberOfScale,MaximalNumberofScale,AWordToRepresentTheScale) where MinimalNumberOfScale and MaximalNumberofScale are numbers and AWordToRepresentTheScale is a string. A further description of this special data entry and where it is used will be given further on.

Algorithms relCompareProducts_ByTopics

This routine's input is the names of the products and the topics by which the comparison of said products should be made. If no topics were specified as an input, the products will be compared by all available topics. "RelCompareProducts_ByTopics" will launch a sub-routine named "relReadDataFile" to load the data entry into operable memory. "RelReadDataFile" will load the "fuzzy_statement"s where said product names appear. Then, by scanning said "fuzzy_statement"s "RelReadDataFile" will retrieve the name of the topics mentioned in those statements and load the respective topics with all the data described above. All "diff_scales" are loaded into the memory as well, since there is no way to tell at this point when they will be needed.

The first operation done at this point, should be scanning the "fuzzy_statement"s and draw conclusions about the relations between them. The data entries are scanned one by one in the following form: first, the name of the topic is obtained from the first "fuzzy_statement". Then, "relCompareProducts_ByTopics" calls a procedure named "relScanStatements" to find all "fuzzy_statement"s that contain the same topic. After "relScanStatements" finds all "fuzzy_statement"s that fulfill said condition, it will calculate the highest and lowest numerical values of all entries found. "RelScanStatements" returns a list of all products associated with the input topic, along with the respective numerical values, a numerical range of these values (from lowest to highest), the names of the products associated with the highest value and the names of the products associated with the lowest value.

After receiving this information, "relCompareProducts_ByTopics" will pass it along with said topic to a sub-routine named "relDecideOnRelation" in order to determine which word(s) to use to describe how said products compare with each other.

"RelDecideOnRelation" will first construct a scale to decide how the input numerical values relate to the global range for the topic. It will refer to the topic description available in the operative memory and extract a) the range associated with the topic, b) the literal representation of the range (words like—sweet, dry, big, small, etc.) and c) the "mid_word"s associated with the topic. Then, it will perform the following arithmetical operations: first, it will substract the minimal value of the range from the maximal value of the range, to receive the amount of units that's inside the range. Second, it will calculate the amount of "mid_words", add 2 to the result and divide the number of units received previously, by this sum. The result represents the amount of units between various significant values of the range (minimum and the next "mid_word", first "mid_word" and second "mid_word", etc.) and saved in the memory as "scale_step(Number)" for future use.

The next and final step is to start adding this number subsequently—from the minimal value of the range to the maximal value of the range, receiving numerical representation of said values as well as numerical representations of "mid_words". The result is saved in the memory in form of: "scale(MinimumOfScale, MaximumOfScale, NameOfScale)."

Here is an example to explain this further: let's assume the topic is "size" with a range of 1 to 100. The minimal value is represented with the word "small", the maximal value—with the word "big". One "mid_word" is defined—"medium". So, the first step is to substract 1 from 100. The result is 99. The following step is to calculate the amount of "mid_words": 1. 1+2 equals 3. 99 divided by 3 is 33. The last step is to start adding this number subsequently to cover the range—so 1+33 is 34, 34+33 is 77 and 77+33 is 100. Thus we get: scale(1, 34, "small") (everything with a value of between 1 and 34 is considered "small"), scale(34, 77, "medium") (everything with a value of between 34 and 77 is considered "medium") and scale(77, 100, "big") (everything with a value of between 1 and 34 is "big").

After that was done, "RelDecideOnRelation" will examine the products given as input. If only one product is specified, the corresponding numeric value will be matched against the "scale" entries. In order to fit in one of the scales, the value is to be bigger or equal to the minimal value of the scale and smaller than the maximal value of the scale in the same time. Once the name of the scale the product belongs to is identified, "RelDecideOnRelation" will save the result in a data entry of a form "prd_rel_info(NameOfScale,NameOfProduct,NameOfOriginalAttribute)". All information regarding "scale"s and "scale_step"s is removed from the memory and "RelDecideOnRelation" exits.

A different case is when more than one product is passed to "RelDecideOnRelation". If that is the situation, several tasks are to be made. First, "RelDecideOnRelation" subtracts the minimal value from the maximal value found among these products and compares this result with "scale_step". If the result is smaller or equal to "scale_step" that means all the products belong to one scale. If it's not—that means "RelDecideOnRelation" will have to divide the products to groups, each group belongs to one scale. This is done by scanning each and every product's numerical value and matching the value against the "scale"s. The result is several groups of products, each assigned a name of a "scale", the minimal and maximal value in the group, the name of the products with the lowest value and the name of the products with the highest value. The comparison is then performed in each group independently: first, "RelDecideOnRelation" extracts the "better_edge" of the topic discussed. If there is no "better" edge, i.e. "better_edge" is set to 'n', the default would be the right side of the relation. Then, based on the previous result, "RelDecideOnRelation" will either calculate the difference between the respective values of the maximal value product and the nearest value or the minimal value product and it's nearest value. Then, the result will be multiplied by 100 and divided by "scale_step". This is done to see just how different the products are from each other, from the discussed topic's view, since the above number represent this difference in percents of the amount of units that separates various categories. The number then matched against the prepared stack of relation words located in "diff_scale" entries, using the following principles—1–20 is "unsignificantly", 20–40 is "little", 40–60 is "quite", 60–80 is "significantly" and 80–99 is "a lot".

If the "better_edge" is '+' (the right side of the relation), "RelDecideOnRelation" will take the "grt_word" out of the topic description. If it's '–'—the "sml_word" will be used. The word received in the previous step is appended to the relation word used and the data is stored in the following form: "prd_rel_info(ProductsInTheLeftSideOfRelation, GeneratedWord, ProductsInRightSideOfRelation, EntireListOfProducts, NameOfCategory, NameOfOriginalAttribute)".

The above operations are performed upon each "fuzzy_statement", subsequentially removing respective data entries from memory, until there are no more "fuzzy_statement"s left. At this point everything is prepared for constructing the natural language output and "RelDecideOnRelation" exits.

Sentence Generation

Data Entry

To construct a natural language output correctly, further data is to be defined in an identical manner both for the standard and the relational comparison modules:

language templates—per each topic there's a need to specify one or more of so-called language templates that provide general guidelines as for how to combine said topic and it's values in one sentence.

These templates are several of (but not limited to) the following: a) "simple"—for cases in which "a product has a Value Topic" (e.g.—a product has a blue color, a round shape, a big size . . . ), b) "is"—for cases in which "a product is Value" (e.g.—a product is blue, big, round), c) "is_noun"—for cases in which "a product is a Value" (e.g.—a product is a shirt, a computer, an apple . . . ), d) "of"—for cases in which "a product is of a Value Topic" (e.g.—a product is of a Big Cheese kind, an Expensive look . . . ), e) "adj"—for cases in which "a Value product" is a correct english sentence (e.g.—a blue product, a big product, a fast product . . . ), f) "tv_adj"—for cases in which "a Value Topic product" is a correct english sentence (e.g.—a big sceen product, a high resolution product, a top quality product . . . ), g) "suitable_top_val"—for cases in which "a product is suitable for Topic Value" (e.g.—a product is suitable for playing alone), h) "suitable_val_top"—for cases in which "a product is suitable for Value Topic" (e.g.—a product is suitable for a big room, a blue wallpaper, KX-456 cellular phone model), i) "other_t"—everything other than described, provided the topic is included—(e.g.—"a product is used for cooking", "a product has a center piece"), j) other_v"—everything other than described, provided the value is included—(e.g.—"a product is not blue", "a product is made in USA"), k) other_tv"—everything other than described, provided the topic and the value are included, in the same order (topic, than value)—(e.g.—"a product is used for cooking breakfast", "a product has a center piece made of stone"), l) other_vt"—everything other than described, provided the value and topic are included, topic follows value—(e.g.—"a product is suitable for children under 12 years of age")

These may be defined both per topic or per each value of the topic separately and they reside in a topic's description as a set of "lang_template(TemplateName, ValueToWhichTheTemplateIsBound, ListOfComplementaryStringsForTheTemplate), where name—is the name of the template as described above, ListOfComplementaryStringsForTheTemplate contains the two complementary strings for "other_xxxxx" templates (for "other_t" and "other_v" these are the two strings before and after the topic or value and for "other_tv" and "other_vt" these are the string before the topic or value and the string between the topic and value. For the rest of templates this list is empty). ValueToWhichTheTemplateIsBound is the name of the topic's value for which the current template is to be used. If ValueToWhichTheTemplateIsBound is an empty string, the template will be used to describe the relation between the topic and any of it's values. Every topic and every value of the topic may have unlimited number of templates associated with it.

Furthermore, an additional file should be available, to serve the purpose of a library. This library is to contain some prepared texts in which the program will place the information related to the comparison of the products (names of the products, topics, values, relational compare information, etc.). There are 2 types of sentences:

"compare_template(NameOfTemplate,Index,String)" where NameOfTemplate is the name of the comparison template type, Index—an asigned counter used for picking a random text of said type and String is the text string that contains variables to be replaced by the program. The second type of text is "tv_template(NameOfLanguageTemplate,Index,String)"—to unify topics and values. NameOfLanguageTemplate is one of the language templates' names described above, plus the keyword "_mult" or "_singl" to suit the text for a case when several products are described (and one must say "first product and second product are blue, are suitable for . . . , are bigger than, have a big size") as well as for a case when only one product is descibed (and one must say "product is blue, is suitable for, is bigger than, has a round shape"). The variables Index and String serve the same purposes as those described in "compare_template" above.

Algorithms

Two major units used to construct the output are a routine named "cmp_SubstVars" and another routine named "update_compare_text". "Cmp_SubstVars" receives a string where various variables are present and replaces the variables with the relevant content. Whereas the content is to be prepared in advance by the calling routine, cmp_SubstVars identifies the variables in the input string provided that the variables are capitalized and enclosed in brackets followed by the % sign, as in: <%VARIABLE_NAME%>. The replacement is done using a simple search of the substrings "<%" and "%>" and looking up the variable enclosed in a look up table. The table contains the names of the accepted variables and pointers to the memory where the content to substitute said variables resides.

"Update_Compare_Text" receives a string previously processed by "cmp_SubstVars", the list of products in that string and another string that represents the type of information residing in the previous string (could be either "similar products", "additional info for products", "relational comparison info" or "distinct product"). If the string passed to it is of a "relational compare" type, this routine also receives the names of products on the left and right sides of the relation in separate relation.

First time running, when there's no previous text to append the string to, "update_compare_text" will measure the length of the string and write the string to the memory as "prev_cmp_text(StrLength, StringType, ProductsList, LeftList, RightList, TheString)". In subsequent calls, this routine will read the "prev_cmp_text" from the memory and perform the following steps: first, it will measure the length of the new string passed as input. Then, it will decide how to unify the current string and the previous string, according to their mutual length. If it is smaller than 110, the two strings will be unified to one sentence. Otherwise, each string will remain an atonomous sentence. "Update_Compare_Text" will proceed to examine the types of the two strings in order to decide which phrase is to come between the two lines to create a grammatically correct and still human sentence. For this purpose, "update_compare_text" accesses it's own internal look up table that consists of "cmp_txt_type_convert(PrevType,CurrType,Phrase)" entries. For example, if PrevType="similar products" and CurType="relational comparison info" then one of the possible phrases can be "Although . . . , . . . " ("Although both p1 and p2 are big, p1 is bigger than p2"). "Phrase" may contain variables of the same form described above, thus making it possible to be processed by "cmp_SubstVars". Once the phrase is chosen, "update_compare_text" will write both the previous and current lines of text to the memory and call "cmp_SubstVars" on the phrase to perform the convertion of variables. The result is stored either as one entry of "prev_cmp_text" (if the two strings were to be unified in the same sentence) or as one entry of "prev_cmp_text" (the current line") and one entry of "cmp_text_str (StrLength, StringType, ProductsList, LeftList, RightList, TheString)" (the previous line). The result of these operations is that in the end we will have a stack of "cmp_text_str" entries in the memory with one additional "prev_cmp_text". These entries can be later grouped to a list of strings and either unified to form one string or outputted "as is", one string by one.

"Construct_compare_text" is the main procedure of the natural text construction. The module accesses the memory directly to retrieve fragments of data asserted by "stdCompareProducts_byTopics" and "relCompareProducts_ByTopics", said fragments of data would be: a) "prd_similar_by (TopicValuePairs, ListOfProducts)" b) "additional_info (Topic, Value, Product, ListOfProducts)" c) "prd_distinct_by(TopicValuePairs, NameOfProduct)" d) "prd_rel_info(NameOfScale,NameOfProduct,NameOfOriginalAttribute)" and e) "prd_rel_info(ProductsInTheLeftSideOfRelation, GeneratedWord, ProductsInRightSideOfRelation, EntireListOfProducts, NameOfCategory,NameOfOriginalAttribute)"

Note: If only standard comparison technique is used, the data fragments marked (d) and (e) will not appear since relational compare is not utilized. If only relational compare is used, data fragments marked (a) through (c) will not appear.

The first thing "construct_compare_text" does is reading the library file described. After this data has been loaded, "construct_compare_text" will start assembling the natural language output. The beginning of the output is the similar products information (located either in "prd_similar_by" entries or in "prd_rel_info" entries if only relational compare has been used). The first entry of this type is fetched and the following operations are performed: first, "construct_compare_text" will build a line representing the similarity between products. For this purpose "construct_compare_text" will launch a routine named "construct_similar_products_text". This routine, given the names of the similar products and the topic-value pairs by which said products are similar will convert the list of the products to a string by separating the list of products to one product plus the remainder of the list, concatenating each product name in the remainder of the list with "," and concatenating the result with the next product name subsequently until there are no more elements in the list. The outcome string is then appended to the first product name by using the following formula: "ResultString and ProductName". Of course, when there's only one product the result would be only the name of the product and "construct_similar_products_text" will write the flag "_singl" to the memory to state we're discussing a single product. In the above case, where multiple products are discussed, "construct_similar_products_text" will write the flag "_mult".

The next task is to unify the topics and values. For this purpose, "construct_similar_products_text" will call a routine named "unify_top_val" with the topic-value pairs passed as input. For each topic-value pair this routine will perform the following steps: first, it will look up the list of available language templates specified for said topic and value. If none are found, "unify_top_val" will attempt to fetch the set of language templates specified for the topic. If no templates were specified for the topic, the default template is "simple".

Once the set of templates is retrieved, "unify_top_val" will randomly choose a template to work with. Then, "unify_top_val" will read the flag previously stored in the memory by "construct_similar_products_text" regarding the number of products we're discussing (could be either "_singl" or "_mult") and append the flag to the name of the chosen template. The result is then used to retrieve the text for placing the topic and value in. The text is chosen randomly from the set of strings in the library file that belong to said type (result of concatenation of the template name and the flag "_singl" or "_mult"). After the text is retrieved, the topic name, products string and value names are stored in the memory and the text is passed to "cmp_SubstVars" that returns a line filled with the relevant content. Said line represents the similar products and the qualifiers that make them similar. It is passed to "update_compare_text" to be later assigned to the other output strings resulting in a meaningful, human like sentence.

After the similarity of said products has been represented via natural language text, and if relational compare is used, "construct_compare_text" will call "construct_relational_compare_text" with an input comprising the list of products peviously located in "prd_similar_by" entry. This routine scans the memory directly to locate the "prd_rel_info(ProductsInTheLeftSideOfRelation, GeneratedWord, ProductsInRightSideOfRelation, EntireListOfProducts, NameOfCategory, NameOfOriginalAttribute)" entries that contain said list of similar products in EntireListOfProducts. Once found, "Construct_relational_compare_text" will convert both ProductsInTheLeftSideOfRelation and ProductsInRightSideOfRelation to strings in a manner described above, choose a random line of text of the type "relational_text" from the library and pass the relevant information to "cmp_SubstVars" to perform the substitution of variables. The result string is also saved in the memory for future use.

Note: when only relational compare is used, "construct_relational_compare_text" also performs these steps: it unifies EntireListOfProducts to a string by the same method used in "construct_similar_products_text", get the proper language templates for NameOfOriginalAttribute, choose a random library text string and call "cmp_SubstVars" to create the final line of text. This is done to fullfill the mission that otherwise would be performed by "construct_similar_products_text"—that is, showing the similarity of said list of products. That line is also passed to "update_compare_text" and by this "construct_relational_compare_text" finishes it's mission and exits.

The next step, is to process the so-called "additional information" for said list of similar products. For this purpose, "construct_compare_text" will launch the routine "construct_add_info_products_text". This routine is given the initial list of similar products as an input, so it may process the list of products as follows: find all "additional_info" and "prd_rel_info" entries in the memory for each product, look if same entries exist for any of the rest products in the list and eventually group the topic-value pairs from both entry types to a string by placing them in the memory, calling unify_top_val, unify the products list and launch "cmp_SubstVars" followed by "update_compare_text". Note that whenever an entry that fullfills said conditions is found it is removed from the memory to avoid finding it again and mentioning the information it represents more than once.

After this was done for each product in the list, exits and we're back to "construct_compare_text". At this point it's safe to say we've processed the list from the original "prd_similar_by" entry and we can now proceed to the next entry of the same type. When there are no more similar products lists (i.e. no more "prd_similar_by" entries in the memory) "construct_compare_text" will proceed to construct a natural language representation for the products that have nothing in common with any other products, i.e—the "prd_distinct_by(TopicValuePairs, NameOfProduct)" and the rest of "prd_rel_info(NameOfScale,NameOfProduct, NameOfAttribute)" entries.

"Construct_compare_text" will launch "construct_distinct_text" to process said entries and generate the natural language output. "Construct_distinct_text" will group the topic-value pairs present in a given "prd_distinct_by" entry by a call to "unify_top_val", previously asserting to the memory the flag "_singl" (since we are discussing one single product here). After this, "construct_distinct_text" will call "update_compare_text" to append the string to the previous text.

This process is repeated until there are no more instances of "prd_distinct_by" in the memory. After the last entry of that kind had been processed, "construct_distinct_text" exits.

"Construct_compare_text" calls "construct_output_text" to perform the output. "Construct_output_text" scans the memory to find each "cmp_text_str" entry, locate the string in it and remove the entry from the memory. After all strings have been found, "Construct_output_text" unifies them by concating each string with "." and concating the result with the next string, until there are no more strings left to process. The result is one string that contains all the text. The text is then outputted to the standard input ("stdin"). Note this is merely one of many possible implementations of the final output.

What is claimed is:

1. A computer based method for supplying comparative information about at least two specified items out of a group of items belonging to any one category, each item of the group having a corresponding data entry in the computer's storage, the data entry including a name, at least one topic and information associated with each topic, said information including at least one value, the method comprising:
retrieving from storage data entries corresponding to the specified items;
among said retrieved entries comparing information associated with like topics;
constructing one or more natural language sentences that reflect results of said retrieving and said comparing, by steps including:
providing a plurality of natural language sentence templates, whereby each possible combination of a topic and category of items is associated with a particular template, and
inserting names, topics and values resulting from said comparing into appropriate respective fields in an appropriate one of said templates; and
presenting said natural language sentences to a user at a display;
wherein not all stored data entries of any group necessarily include identical topics and said comparing includes comparing values associated with like topics, if any;
wherein said comparing includes, for any topic common to at least two of the retrieved entries-
(i) finding within said at least two of the retrieved entries any values that are mutually equal, grouping all items that correspond to any thus identified value together as a similarity group, noting their names and associating said group with said common topic and with said equal value; and
(ii) if no equal values are found, noting the names and values of all corresponding items, in association with said common topic;
wherein said constructing includes constructing a natural language statement for each of said common topics which reflects respective results of substep (i) or substep (ii); the method further comprising:
(iii) identifying any topic that is not common to any two or more of the retrieved entries, and noting one or more values associated with the thus identified topic in the respective entry, together with the respective name; and (iv) constructing a natural language statement that includes the name, topic and values noted in substep (iii).

2. The method of claim 1, wherein there are also specified topics and said comparing is confined to the specified topics.

3. The method of claim 1, further comprising, for any item in any similarity group-
   (v) finding in the corresponding retrieved entry one or more values, if any, associated with the respective topic, that are different from the respective common value and noting any thus found value in association with the respective name and the respective topic; and
   (vi) constructing a natural language statement that includes the name and values noted in substep (v) and appending it to the statement that reflects results of substep
   (i) with respect to the noted topic.

4. A program storage device readable by a computer, having embodied in a computer readable medium a program of instructions executable by the computer to perform method steps for supplying comparative information about at least two specified items out of a group of items belonging to any one category; each item of the group having a corresponding data entry in the computer's storage, the data entry including a name, at least one topic and information associated with each topic, said information including at least one value, the method steps comprising:

retrieving from storage data entries corresponding to the specified items;

among said retrieved entries comparing information associated with like topics; and constructing one or more natural language sentences that reflect results of said retrieving and said comparing, by steps including:

providing a plurality of natural language sentence templates, whereby each possible combination of a topic and category of items is associated with a particular template, and inserting names, topics and values resulting from said comparing into appropriate respective fields in an appropriate one of said templates;

wherein not all stored data entries of any group necessarily include identical topics and said comparing includes comparing values associated with like topics, if any;

wherein said comparing includes, for any topic common to at least two of the retrieved entries-
   (i) finding within said at least two of the retrieved entries any values that are mutually equal, grouping all items that correspond to any thus identified value together as a similarity group, noting their names and associating said group with said common topic and with said equal value; and
   (ii) if no equal values are found, noting the names and values of all corresponding items, in association with said common topic;

wherein said constructing includes constructing a natural language statement for each of said common topics which reflects respective results of substep (i) or substep (ii);

the method further comprising:
   (iii) identifying any topic that is not common to any two or more of the retrieved entries, and noting one or more values associated with the thus identified topic in the respective entry, together with the respective name; and
   (iv) constructing a natural language statement that includes the name, topic and values noted in substep (iii).

5. The storage device of claim 4, wherein not all stored data entries of any group necessarily include identical topics and said comparing includes comparing values associated with like topics, if any.

6. The storage device of claim 4, wherein-
   any topic is associated with a range of values, extending between two extreme values, and with a numerical scale whose minimum and maximum values correspond to respective extreme values of the range, such a topic being a fuzzy topic;
   in any data entry, the information associated with any fuzzy topic includes a position number within the respective scale, which number corresponds to a value within the respective range; and
   said comparing includes, with respect to any fuzzy topic, comparing the respective position numbers.

7. A computer program product comprising a computer readable medium having computer readable program code embodied therein for supplying comparative information about at least two specified items out of a group of items belonging to any one category, each item of the group having a corresponding data entry in the computer's storage, the data entry including a name, at least one topic and information associated with each topic, said information including at least one value, the computer program product comprising:

computer readable program code for causing the computer to retrieve from storage data entries corresponding to the specified items;

computer readable program code for causing the computer to compare, among said retrieved entries, information associated with like topics; and computer readable program code for causing the computer to construct one or more natural language sentences that reflect results of said retrieving and said comparing, by steps including:

providing a plurality of natural language sentence templates, whereby each possible combination of a topic and category of items is associated with a particular template, and inserting names, topics and values resulting from said comparing into appropriate respective fields in an appropriate one of said templates;

wherein not all stored data entries of any group necessarily include identical topics and said comparing includes comparing values associated with like topics, if any;

wherein said comparing includes, for any topic common to at least two of the retrieved entries-
   (i) finding within said at least two of the retrieved entries any values that are mutually equal, grouping all items that correspond to any thus identified value together as a similarity group, noting their names and associating said group with said common topic and with said equal value; and
   (ii) if no equal values are found, noting the names and values of all corresponding items, in association with said common topic;

wherein said constructing includes constructing a natural language statement for each of said common topics which reflects respective results of substep (i) or substep (ii); the method further comprising:

(iii) identifying any topic that is not common to any two or more of the retrieved entries, and noting one or more values associated with the thus identified topic in the respective entry, together with the respective name; and (iv) constructing a natural language statement that includes the name, topic and values noted in substep (iii).

8. A computer based method for supplying comparative information about at least two specified items out of a group of items belonging to any one category, each item of the group having a corresponding data entry in the computer's storage, the data entry including a name, at least one topic and information associated with each topic, said information including at least one value, the method comprising:

retrieving from storage data entries corresponding to the specified items;

among said retrieved entries comparing information associated with like topics;

constructing one or more natural language sentences that reflect results of said retrieving and said comparing, by steps including:

providing a plurality of natural language sentence templates, whereby each possible combination of a topic and category of items is associated with a particular template, and inserting names, topics and values resulting from said comparing into appropriate respective fields in an appropriate one of said templates; and presenting said natural language sentences to a user at a display;

whereinany topic is associated with a range of values, extending between two extreme values, and with a numerical scale whose minimum and maximum values correspond to respective extreme values of the range, such a topic being a fuzzy topic;

in any data entry, the information associated with any fuzzy topic includes a position number within the respective scale, which number corresponds to a value within the respective range; and said comparing includes, with respect to any fuzzy topic, comparing the respective position numbers;

wherein said comparing includes, with respect to any fuzzy topic, finding among said retrieved entries the highest and lowest position values, dividing the values between them into one or more identifiable subranges, associating each item with one of said subranges according to the corresponding position value and grouping all items according to their associated subranges, noting their respective names and noting for each group its respective subrange and the common topic; and wherein any fuzzy topic is further associated with a set of relational words, appropriate to its range of values, and wherein said constructing includes constructing, for any noted topic, natural language statements containing noted names, and relational words that reflect positions of respective noted subranges relative to each other or relative to said highest and lowest position values or relative to said scale.

9. The method of claim 8, wherein any of the relational words refers to one end of the range of values as being better or preferred relative to the other end.

10. The method of claim 8, wherein any of the relational words refers to one or more values that are between the extremes of the range.

11. A computer based method for supplying comparative information about at least two specified items out of a group of items belonging to any one category, each item of the group having a corresponding data entry in the computer's storage, the data entry including a name, at least one topic and information associated with each topic, said information including at least one value, the method comprising:

retrieving from storage data entries corresponding to the specified items;

among said retrieved entries comparing information associated with like topics;

constructing one or more natural language sentences that reflect results of said retrieving and said comparing, by steps including:

providing a plurality of natural language sentence templates, whereby each possible combination of a topic and category of items is associated with a particular template, and inserting names, topics and values resulting from said comparing into appropriate respective fields in an appropriate one of said templates; and presenting said natural language sentences to a user at a display;

wherein said constructing further includes combining a plurality of said statements having at least one item in common into a sentence, using connective words appropriate to the comparison-based relation between the respective statements; and wherein said constructing further includes-providing a library of connective phrases;

selecting one or more phrases from said library at random; and concatenating a plurality of sentences that relate to a common category, whereby they are augmented by said selected phrases.

12. The method of claim 11, wherein at least one topic is fuzzy and at least one topic has one or more values associated therewith and wherein said plurality of statements includes at least one statement relating to a fuzzy topic and at least one statement relating to one or more values.

13. The method of claim 8, further comprising creating in the computer storage a data entry, corresponding to any item for which such an entry does not exist, the data entry includinga name, at least one topic, at least one of which is a fuzzy topic, and, associated with any fuzzy topic, a position number.

14. A program storage device readable by a computer, having embodied in a computer readable medium a program of instructions executable by the computer to perform method steps for supplying comparative information about at least two specified items out of a group of items belonging to any one category, each item of the group having a corresponding data entry in the computer's storage, the data entry including a name, at least one topic and information associated with each topic, said information including at least one value, the method steps comprising:

retrieving from storage data entries corresponding to the specified items;

among said retrieved entries comparing information associated with like topics; and constructing one or more natural language sentences that reflect results of said retrieving and said comparing, by steps including:

providing a plurality of natural language sentence templates, whereby each possible combination of a topic and category of items is associated with a particular template, and inserting names, topics and values resulting from said comparing into appropriate respective fields in an appropriate one of said templates;

whereinany topic is associated with a range of values, extending between two extreme values, and with a numerical scale whose minimum and maximum values correspond to respective extreme values of the range, such a topic being a fuzzy topic;

in any data entry, the information associated with any fuzzy topic includes a position number within the respective scale, which number corresponds to a value within the respective range; and said comparing includes, with respect to any fuzzy topic, comparing the respective position numbers;

wherein said comparing includes, with respect to any fuzzy topic, finding among said retrieved entries the highest and lowest position values, dividing the values between them into one or more identifiable subranges, associating each item with one of said subranges according to the corresponding position value and grouping all items according to their associated subranges, noting their respective names and noting for each group its respective subrange and the common topic; and wherein any fuzzy topic is further associated with a set of relational words, appropriate to its range of values, and wherein said constructing includes constructing, for any noted topic, natural language statements containing noted names, and relational words that reflect positions of respective noted subranges relative to each other or relative to said highest and lowest position values or relative to said scale.

15. A program storage device readable by a computer, having embodied in a computer readable medium a program of instructions executable by the computer to perform method steps for supplying comparative information about at least two specified items out of a group of items belonging to any one category, each item of the group having a corresponding data entry in the computer's storage, the data entry including a name, at least one topic and information associated with each topic, said information including at least one value, the method steps comprising:

retrieving from storage data entries corresponding to the specified items;

among said retrieved entries comparing information associated with like topics; and constructing one or more natural language sentences that reflect results of said retrieving and said comparing, by steps including:

providing a plurality of natural language sentence templates, whereby each possible combination of a topic and category of items is associated with a particular template, and inserting names, topics and values resulting from said comparing into appropriate respective fields in an appropriate one of said templates;

wherein said constructing further includes combining a plurality of said statements having at least one item in common into a sentence, using connective words appropriate to the comparison-based relation between the respective statements; and wherein said constructing further includes-providing a library of connective phrases;

selecting one or more phrases from said library at random; and concatenating a plurality of sentences that relate to a common category, whereby they are augmented by said selected phrases.

16. A computer program product comprising a computer readable medium having computer readable program code embodied therein for supplying comparative information about at least two specified items out of a group of items belonging to any one category, each item of the group having a corresponding data entry in the computer's storage, the data entry including a name, at least one topic and information associated with each topic, said information including at least one value, the computer program product comprising:

computer readable program code for causing the computer to retrieve from storage data entries corresponding to the specified items;

computer readable program code for causing the computer to compare, among said retrieved entries, information associated with like topics; and computer readable program code for causing the computer to construct one or more natural language sentences that reflect results of said retrieving and said comparing, by steps including:

providing a plurality of natural language sentence templates, whereby each possible combination of a topic and category of items is associated with a particular template, and inserting names, topics and values resulting from said comparing into appropriate respective fields in an appropriate one of said templates;

whereinany topic is associated with a range of values, extending between two extreme values, and with a numerical scale whose minimum and maximum values correspond to respective extreme values of the range, such a topic being a fuzzy topic;

in any data entry, the information associated with any fuzzy topic includes a position number within the respective scale, which number corresponds to a value within the respective range; and said comparing includes, with respect to any fuzzy topic, comparing the respective position numbers;

wherein said comparing includes, with respect to any fuzzy topic, finding among said retrieved entries the highest and lowest position values, dividing the values between them into one or more identifiable subranges, associating each item with one of said subranges according to the corresponding position value and grouping all items according to their associated subranges, noting their respective names and noting for each group its respective subrange and the common topic; and wherein any fuzzy topic is further associated with a set of relational words, appropriate to its range of values, and wherein said constructing includes constructing, for any noted topic, natural language statements containing noted names, and relational words that reflect positions of respective noted subranges relative to each other or relative to said highest and lowest position values or relative to said scale.

17. A computer program product comprising a computer readable medium having computer readable program code embodied therein for supplying comparative information about at least two specified items out of a group of items belonging to any one category, each item of the group having a corresponding data entry in the computer's storage, the data entry including a name, at least one topic and information associated with each topic, said information including at least one value, the computer program product comprising:

- computer readable program code for causing the computer to retrieve from storage data entries corresponding to the specified items;
- computer readable program code for causing the computer to compare, among said retrieved entries, information associated with like topics; and
- computer readable program code for causing the computer to construct one or more natural language sentences that reflect results of said retrieving and said comparing, by steps including:
  - providing a plurality of natural language sentence templates, whereby each possible combination of a topic and category of items is associated with a particular template, and
  - inserting names, topics and values resulting from said comparing into appropriate respective fields in an appropriate one of said templates;
- wherein said constructing further includes combining a plurality of said statements having at least one item in common into a sentence, using connective words appropriate to the comparison-based relation between the respective statements; and
- wherein said constructing further includes-
- providing a library of connective phrases;
- selecting one or more phrases from said library at random; and
- concatenating a plurality of sentences that relate to a common category, whereby they are augmented by said selected phrases.

* * * * *